United States Patent [19]

Shibahata

[11] Patent Number: 4,981,191
[45] Date of Patent: Jan. 1, 1991

[54] FRONT AND REAR ROAD WHEEL DRIVE APPARATUS FOR MOTOR VEHICLE

[75] Inventor: Yasuji Shibahata, Tochigi, Japan

[73] Assignee: Honda Giken Kogyo Kabushiki Kaisha, Tokyo, Japan

[21] Appl. No.: 297,374

[22] Filed: Jan. 17, 1989

[30] Foreign Application Priority Data

Jan. 18, 1988 [JP] Japan .................. 63-7845

[51] Int. Cl.⁵ ........................... B60K 17/354
[52] U.S. Cl. .................... 280/245; 280/249
[58] Field of Search ............. 180/245, 246, 249, 233, 180/244, 248, 249, 245

[56] References Cited

U.S. PATENT DOCUMENTS

| | | | |
|---|---|---|---|
| 4,693,334 | 9/1987 | Hiraiwa | 180/249 |
| 4,787,269 | 11/1988 | Matsumoto | 180/247 |
| 4,805,721 | 2/1989 | Takahashi et al. | 180/248 |

FOREIGN PATENT DOCUMENTS

| | | | |
|---|---|---|---|
| 0072990A1 | 3/1983 | European Pat. Off. | |
| 0162021A1 | 11/1985 | European Pat. Off. | |
| 0177286A2 | 4/1986 | European Pat. Off. | |
| 3533142 | 4/1986 | Fed. Rep. of Germany | 180/248 |
| 0179425 | 10/1984 | Japan | 180/248 |
| 0135327 | 7/1985 | Japan | 180/248 |
| 0178233 | 8/1986 | Japan | 180/248 |
| 0191434 | 8/1986 | Japan | 180/248 |
| 0295727 | 12/1987 | Japan | 180/248 |
| 2154522A | 9/1985 | United Kingdom | |

Primary Examiner—Charles A. Marmor
Assistant Examiner—Anne Marie Boehler
Attorney, Agent, or Firm—Armstrong, Nikaido, Marmelstein, Kubovcik & Murray

[57] ABSTRACT

A front and rear wheel road wheel drive apparatus transmits drive power from a drive power source in a motor vehicle to main and auxiliary drive road wheels and controls the transmitted drive power to improve operating performance of the motor vehicle such as turning performance in low- and medium-speed ranges and running stability in a high-speed range. The apparatus includes a first differential operatively coupled to the main drive road wheels for receiving the drive power from the drive power source, a second differential operatively coupled to the auxiliary drive road wheels and having clutch means for variably adjusting the amounts of drive power to be transmitted to the auxiliary drive road wheels independently of each other, a drive power transmitting mechanism for transmitting the drive power from the drive power source via the first differential to the second differential, and a speed increasing device disposed in the drive power transmitting mechanism for varying the rotational speed of the drive power supplied from the drive power source.

10 Claims, 5 Drawing Sheets

FRONT AND REAR ROAD WHEEL DRIVE APPARATUS FOR MOTOR VEHICLE

BACKGROUND OF THE INVENTION

1. Field of the Invention:

The present invention relates to an apparatus for driving the front and rear road wheels of a motor vehicle, and more particularly to an apparatus for driving the front and rear road wheels of a motor vehicle in order to improve turning performance or capability of the motor vehicle in low- and medium-speed ranges and also to improve the stability of the motor vehicle in a high-speed range.

2. Description of the Relevant Art:

As shown in FIG. 1 of the accompanying drawings, there is known a front and rear road wheel drive motor vehicle (hereinafter referred to as a "4WD motor vehicle") in which drive power from an engine 1 is transmitted through a transmission T/M and an output shaft 2 thereof to a front wheel differential 3 comprising a differential case 4 and a pair of output shafts 5, 6 coupled to respective front road wheels FW through drive axles 7, 8, respectively, and then the drive power is transmitted from the front wheel differential 3 through a propeller shaft 9 to a rear wheel differential 13 for driving a pair of rear road wheels RW. The rear wheel differential 13 has a differential case 14 to which the rear end of the propeller shaft 9 is coupled through meshing gears 11, 12. The differential case 14 is combined with a pair of torque transmitting clutches (e.g., hydraulic multiplate clutches) 21, 25 mounted respectively on output shafts 15, 16 coupled to the respective rear road wheels RW through drive axles 17, 18, respectively. The hydraulic multiplate clutches 21, 25 are controlled by a hydraulic pressure control system (not shown) for varying the drive power to be transmitted to the output axles 15, 16.

More specifically, the hydraulic multiplate clutches 21, 25 comprise outer plates 22, 26, respectively, fixed to lefthand and righthand portions of the differential case 14 and inner plates 23, 27, respectively, fixed to the respective output axles 15, 16 and alternating with the outer plates 22, 26. The drive power to be transmitted to the output axles 15, 16 can be varied by introducing oil under pressure into hydraulic pressure chambers 24, 28 of the respective clutches 21, 25.

Now, it is assumed that the 4WD motor vehicle makes a turn as shown in FIG. 2. When the motor vehicle is smoothly steered while the engine power is small and the front road wheels FW are subjected to a small degree of slippage, the outer rear wheel RW (with respect to the turning circle) which is an auxiliary drive road wheel runs along a path $r_4$ that is positioned outwardly of an average path $f_0$ of the front road wheels FW which are main drive road wheels. Ideally, therefore, the rotational speeds $\omega_1$, $\omega_2$ of the inner and outer front road wheels FW, the rotational speed $\omega_0$ of the propeller shaft 9, and the rotational speeds $\omega_3$, $\omega_4$ of the inner and outer rear road wheels RW should preferably meet the following relationship:

$$\frac{\omega_1 + \omega_2}{2} < \omega_4 \left( \omega_0 = \frac{\omega_1 + \omega_2}{2} \right)$$

In the 4WD motor vehicle shown in FIG. 1, however, even if the pressure applied to the hydraulic multiplate clutch 25 associated with the outer rear road wheel RW is increased, the rotational speed $\omega_4$ does not exceed the rotational speed $\omega_0$, but is equal to the rotational speed $\omega_0$ at most. It has been unable to produce drive power to rotate the outer rear road wheel RW so that the relationship $\omega_0 < \omega_4$ will be achieved. Consequently, the motor vehicle undergoes tight-corner braking when making a turn.

If the pressure applied to the hydraulic multiplate clutch 25 coupled to the outer rear road wheel RW were lowered, then the condition $\omega_0 < \omega_4$ would be reached, but this would fail to accomplish the advantages of the 4WD motor vehicle resulting from the positive driving of all the front and rear road wheels.

The 4WD motor vehicle shown in FIG. 1 is structurally based on a front-engine, front-wheel-drive (FF) motor vehicle. However, the above problems are also associated with a 4WD motor vehicle which is structurally based on a rear-engine, rear-wheel-drive (RR) motor vehicle.

More specifically, FIG. 3 shows a 4WD motor vehicle in which engine power is transmitted from a transmission output shaft 2 to a rear wheel differential 3 and then transmitted from the rear wheel differential 3 through a propeller shaft 9 to a front wheel differential 13. The front wheel differential 13 has hydraulic multiplate clutches 21, 25, identical to those shown in FIG. 1, disposed in a differential case 14 and mounted respectively on front wheel output shafts 15, 16.

When the 4WD motor vehicle makes a turn as shown in FIG. 4, since the outer front wheel (with respect to the turning circle) which is an auxiliary drive road wheel runs along a path $f_2$, that is positioned outwardly of an average path $r_0$ of the rear road wheels which are main drive road wheels, the following relationship should preferably be met:

$$\frac{\omega_3 + \omega_4}{2} < \omega_2 \left( \omega_0 = \frac{\omega_3 + \omega_4}{2} \right)$$

However, even if the pressure applied to the hydraulic multiplate clutch 25 associated with the outer front road wheel is increased, it is unable to produce drive power to rotate the outer front road wheel so that the relationship $\omega_0 < \omega_2$ will be achieved.

This also holds true for a 4WD motor vehicle that is structurally based on a front-engine, rear-wheel-drive (FR) motor vehicle, not shown.

SUMMARY OF THE INVENTION

In view of the aforesaid conventional drawbacks, it is an object of the present invention to provide an apparatus for driving the front and rear road wheels of a 4WD motor vehicle which has main and auxiliary drive road wheels and a pair of torque transmitting clutches controllable by a differential associated with the auxiliary drive road wheels, the apparatus having a speed increasing capability given to a drive power transmitting path from a differential coupled to the main drive road wheels to the differential coupled to the auxiliary drive road wheels for making drive power applied to the main drive road wheels lower than drive power imposed on the auxiliary drive road wheels, so that when the motor vehicle makes a turn, a drive torque applied to an outer one of the auxiliary drive road wheels can be larger than a drive torque applied to an inner one of the auxiliary drive road wheels by controlling the torque transmitting clutches for improving operating performance or abilities, such as turning performance or ability, of the motor vehicle.

According to the present invention, there is provided an apparatus for driving the front and rear road wheels of a motor vehicle by transmitting drive power from a drive power source to the road wheels which serve as main and auxiliary drive road wheels of the motor vehicle, the apparatus comprising: a first differential operatively coupled to the main drive road wheels for receiving the drive power from the drive power source; a second differential operatively coupled to the auxiliary drive road wheels and having clutch means for variably adjusting the amounts of drive power to be transmitted to the auxiliary drive road wheels independently of each other; a drive power transmitting mechanism for transmitting the drive power from the drive power source via the first differential to the second differential; and a speed increasing device disposed in the drive power transmitting mechanism for varying the rotational speed of the drive power supplied from the drive power source.

According to the present invention, there is also provided an apparatus for driving the front and rear road wheels of a motor vehicle by transmitting drive power from a drive power source to the road wheels which serve as main and auxiliary drive road wheels of the motor vehicle, the apparatus comprising: a first differential operatively coupled to the main drive road wheels for receiving the drive power from the drive power source; a second differential operatively coupled to the auxiliary drive road wheels and having clutch means for variably adjusting the amounts of drive power to be transmitted to the auxiliary drive road wheels independently of each other; a drive power transmitting mechanism for connecting the first and second differentials to each other in torque transmitting relation and for receiving the drive power from the drive power source in complementary torque transmitting relation to the first differential; and converting means for variably converting the drive power applied to the drive power transmitting mechanism with respect to the rotational speed thereof and applying the drive power with the converted rotational speed to the second differential.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
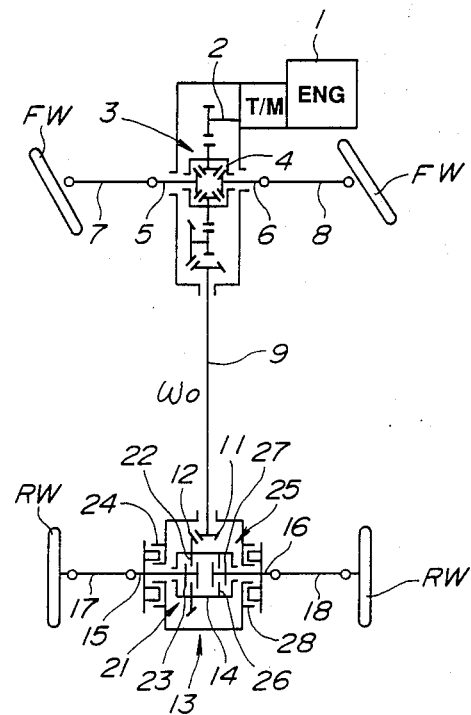
FIG. 1 is a schematic view of a drive system of a 4WD motor vehicle which is structurally based on an FF motor vehicle and in which a front and rear road wheel drive apparatus according to the present invention can be incorporated.

Like or corresponding parts are denoted by like or corresponding reference numerals throughout views.

Figure 3:
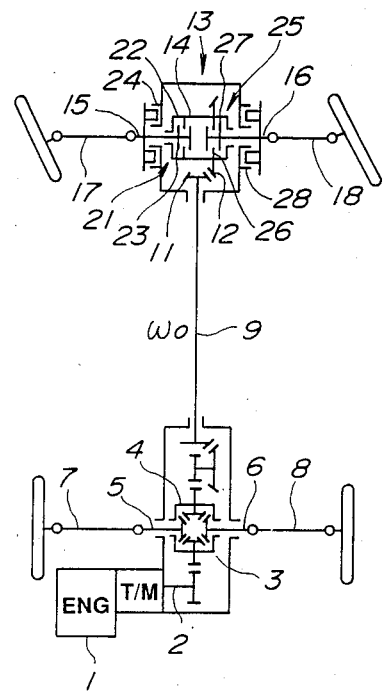
FIG. 3 is a schematic view of a drive system of a 4WD motor vehicle which is structurally based on a RR motor vehicle and in which a front and rear road wheel drive apparatus according to the present invention can be incorporated.

A front and rear road wheel drive apparatus according to the present invention can be incorporated in a 4WD motor vehicle structurally based on an FF motor vehicle as shown in FIG. 1, a 4WD motor vehicle structurally based on a RR motor vehicle as shown in FIG. 3, or a 4WD motor vehicle structurally based on an FR motor vehicle. A speed increasing device according to the present invention in the front and rear road wheel drive apparatus is basically mounted on a propeller shaft 9 serving as a drive power transmitting path extending from a differential 3 associated with main drive road wheels to a differential 13 associated with auxiliary drive road wheels as shown in each of FIGS. 1 and 3.

Figure 5:
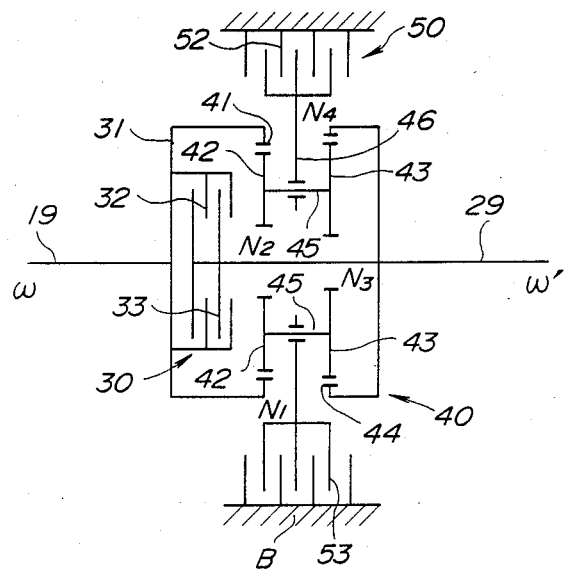
FIG. 5 is a schematic view of a speed increasing device according to a first embodiment of the present invention.

FIG. 5 schematically shows a speed increasing device according to a first embodiment of the present invention which is included in the front and rear road wheel drive apparatus. The speed increasing device essentially comprises an input shaft 19, an output shaft 29, a direct coupling clutch 30, a speed increasing mechanism 40, and a speed increasing clutch 50. The input shaft 19 receives drive power from the main drive road wheel differential 3 as illustrated in FIGS. 1 and 3, and drive power from the output shaft 29 is transmitted to the auxiliary drive road wheel differential 13.

As shown in FIG. 5, the direct coupling clutch 30 is disposed between the input shaft 19 and the output shaft 29. The direct coupling clutch 30 is in the form of a hydraulic multiplate clutch comprising a drum 31 integrally mounted on an end of the input shaft 19, outer plates 32 disposed in and fixed to the drum 31, and inner plates 33 fixedly mounted on an end of the output shaft 29 and alternating with the outer plates 32. The speed increasing mechanism 40 is positioned between the clutch drum 31 and the output shaft 29. The speed increasing mechanism 40 is in the form of a planetary gear mechanism comprising an internal gear 41 on an end of the clutch drum 31, a plurality of smaller pinion gears 42 meshing with the internal gear 41, a plurality of larger pinion gears 43 coupled respectively to the smaller pinion gears 42 through respective connecting shafts 45 for rotation therewith, and an internal gear 44 meshing with the larger pinion gears 43 and fixedly mounted on the output shaft 29.

The connecting shafts 45 between the pinion gears 42, 43 are supported on a carrier 46. The speed increasing clutch 5 is connected between the carrier 46 and a motor vehicle body B, the speed increasing clutch 50 comprising a hydraulic multiplate clutch having outer plates 52 fixed to the motor vehicle body B and inner plates 53 fixed to the carrier 46 and alternating with the outer plates 52.

The number $N_1$ of teeth of the internal gear 41 on the input shaft 19, the number $N_2$ of teeth of the smaller pinion gears 42, the number $N_3$ of teeth of each of the larger pinion gears 43, and the number $N_4$ of teeth of each of the internal gear 44 on the output shaft 29 are selected to meet the following relationship:

$$\frac{N_1}{N_2} \times \frac{N_3}{N_4} > 1.0 \tag{1}$$

The propeller shaft 9 serving as the drive power transmitting path between the front and rear road wheels of the 4WD motor vehicle is therefore combined with either the speed increasing device which comprises the direct coupling clutch 30, the speed increasing mechanism 40, and the speed increasing clutch 50 for providing a speed changing function, or a speed increasing device capable of changing the speed of rotation of the input shaft.

When the direct coupling clutch 30 is engaged or ON and the speed increasing clutch 50 is disengaged or OFF, drive power from the input shaft 19 is directly transmitted to the output shaft 29 through the direct coupling clutch 30. At this time, the speed increasing mechanism 40 idly rotates since the speed increasing clutch 50 is OFF. Accordingly, the rotational speed $\omega'$ of the output shaft 29 is equal to the rotational speed $\omega$ of the input shaft 19 ($\omega' = \omega$).

When the direct coupling clutch 30 is OFF and the speed increasing clutch 50 is ON, drive power from the input shaft 19 is transmitted through the speed increasing mechanism 40, i.e., the internal gear 41, the smaller pinion gears 42, the connecting shafts 45, the larger pinion gears 43, and the internal gear 44 to the output shaft 29 while bypassing the direct coupling clutch 30. At this time, the rotational speed $\omega'$ of the output shaft 29 and the rotational speed $\omega$ of the input shaft 19 are related to each other as follows:

$$\omega' = \frac{N_1}{N_2} \times \frac{N_3}{N_4} \times \omega \tag{2}$$

Therefore, the rotational speed $\omega'$ of the output shaft 29 is higher than the rotational speed $\omega$ of the input shaft 19 ($\omega' > \omega$)

Since the drive power from the engine can be transmitted to the differential 13 associated with the auxiliary drive road wheels through the speed increasing mechanism 40, the drive power applied to the auxiliary drive road wheels can be made greater than the drive power applied to the main drive road wheels. Stated otherwise, the drive power from the differential 3 coupled to the main drive road wheels is increased in its rotational speed and then transmitted to the differential 13 coupled to the auxiliary drive road wheels, and as a result greater drive power can be applied to the auxiliary drive road wheels than to the main drive road wheels.

By operating a hydraulic pressure control device (described later) to send high oil pressure into a hydraulic multiplate clutch coupled to an outer road wheel, e.g., the hydraulic multiplate clutch 25, for example, in the auxiliary drive road wheel differential 13, when the motor vehicle makes a turn, the inner plates 27 and the outer plates 26 are frictionally engaged to connect the clutch 25 to transmit the drive power with an increased speed to the output shaft 16 connected to the outer road wheel.

Figure 2:
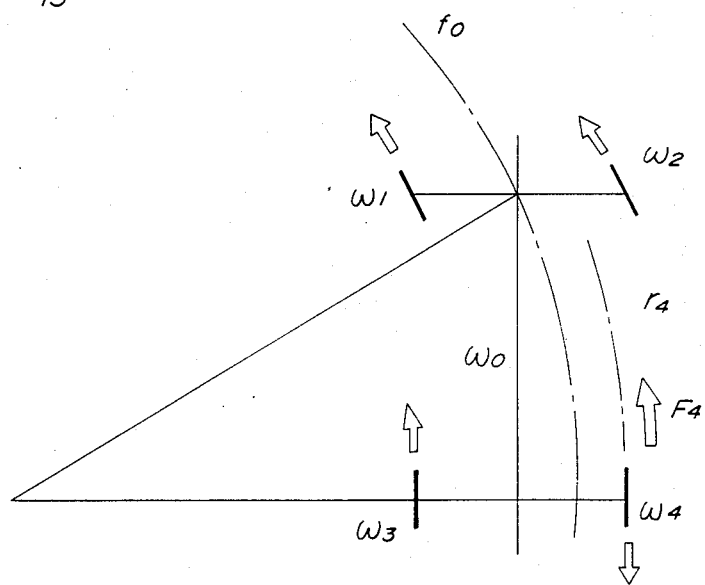
FIG. 2 is a diagram showing the manner in which the 4WD motor vehicle of FIG. 1 makes a turn and also showing operation of the front and rear road wheel drive apparatus.

While the motor vehicle is making a turn as shown in FIG. 2, the drive torque applied to the outer rear road wheel which is an auxiliary drive road wheel is rendered greater than the drive torque applied to the inner rear road wheel, as indicated by the arrow $F_4$, so that the turning performance or ability of the 4WD motor vehicle can be improved in low- and medium-speed ranges.

Conversely, it is also possible to increase the drive torque applied to the inner rear road wheel greater than the drive torque applied to the outer rear road wheel for higher running stability of the motor vehicle in a high-speed range.

Figure 4:
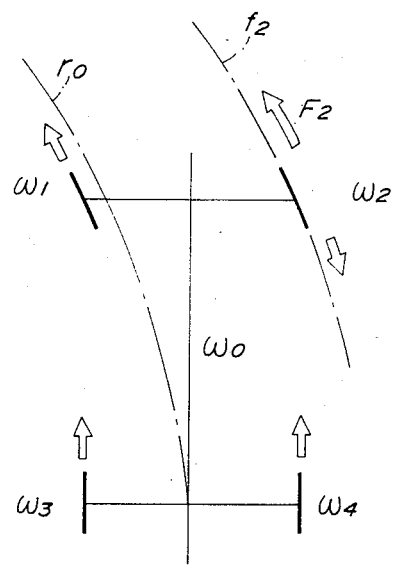
FIG. 4 is a diagram showing the manner in which the 4WD motor vehicle of FIG. 3 makes a turn and also showing operation of the front and rear road wheel drive apparatus.

Likewise, while the motor vehicle is making a turn as shown in FIG. 4, the drive torque applied to the outer front road wheel which is an auxiliary drive road wheel is rendered greater than the drive torque applied to the inner front road wheel, as indicated by the arrow $F_2$, for improving the turning performance or ability of the 4WD motor vehicle in low- and medium-speed ranges. Conversely, the drive torque applied to the inner front road wheel is increased greater than the drive torque applied to the outer rear road wheel for higher running stability of the motor vehicle in a high-speed range.

As described above, the drive power applied to the auxiliary drive road wheels can be made greater than the drive power applied to the main drive road wheels without lowering or losing the merits or advantages of the 4WD motor vehicle which drives all the four wheels. Consequently, the operating performance of the motor vehicle such as the turning performance in low- and medium-speed ranges and the running stability in a high-speed range can be improved by controlling the hydraulic multiplate clutches (i.e., the torque transmitting clutches) in the differential associated with the auxiliary drive road wheels.

Figure 6:
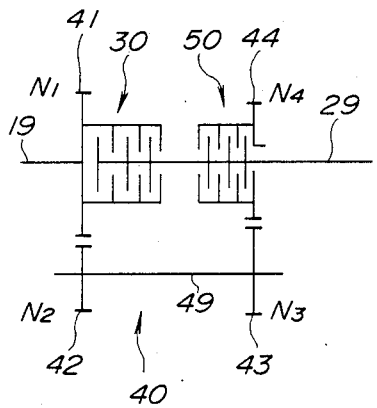
FIG. 6 is a schematic view of a speed increasing device according to a second embodiment of the present invention.

FIG. 6 schematically shows a speed increasing device according to a second embodiment of the present invention. The speed increasing device includes a speed increasing mechanism 40 comprising a hydraulic multiplate direct coupling clutch 30 and a gear 41 (the number of teeth: $N_1$) which are mounted on an input shaft 19, a gear 42 (the number of teeth: $N_2$) meshing with the gear 41 and mounted on a countershaft 49 parallel to the input shaft 19, a gear 43 (the number of teeth: $N_3$) mounted on the countershaft 49, and a hydraulic multiplate speed increasing clutch 50 through which a gear 44 (the number of teeth: $N_4$) is connected to an output shaft 29, the gear 44 being held in mesh with the gear 43. The speed increasing device shown in FIG. 6 has the same function as that of the speed increasing device according to the first embodiment by selecting the numbers of teeth of these gears 41, 42, 43, 44 to meet the relationship (1) given above.

Figure 7:
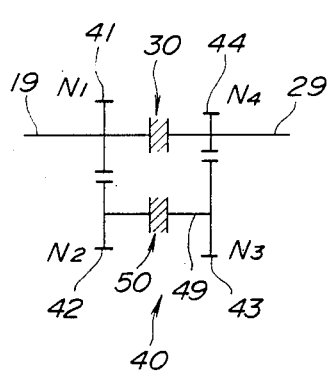
FIG. 7 is a schematic view of a speed increasing device according to a third embodiment of the present invention.

FIG. 7 schematically illustrates a speed increasing device according to a third embodiment of the present invention. The speed increasing device of FIG. 7 includes a speed increasing mechanism 40 comprising a gear 41 ($N_1$), a gear 42 ($N_2$) meshing with the gear 41 and mounted on a countershaft 49, a gear 43 ($N_3$) mounted on the countershaft 49, and a gear 44 ($N_4$) mounted on an output shaft 29 and meshing with the gear 43. The speed increasing mechanism 40 also includes a direct coupling clutch 30 disposed between the input and output shafts 19, 29. The countershaft 49 is divided into two shaft portions supporting the gears 42, 43, respectively, and selectively connectable and disconnectable by a speed increasing clutch 50 therebetween. The speed increasing device of FIG. 7 also has the same function as that of the speed increasing device according to the first embodiment by selecting the numbers of teeth of the gears 41, 42, 43, 44 to meet the relationship (1).

The clutches in the speed increasing device are not limited to hydraulic multiplate clutches, but may be solenoid-operated clutches. Alternatively, the direct coupling clutch may be a one-way clutch and the speed increasing clutch may be a hydraulic multiplate clutch. Furthermore, these clutches may be dog clutches or any other desired clutches.

Figure 8:
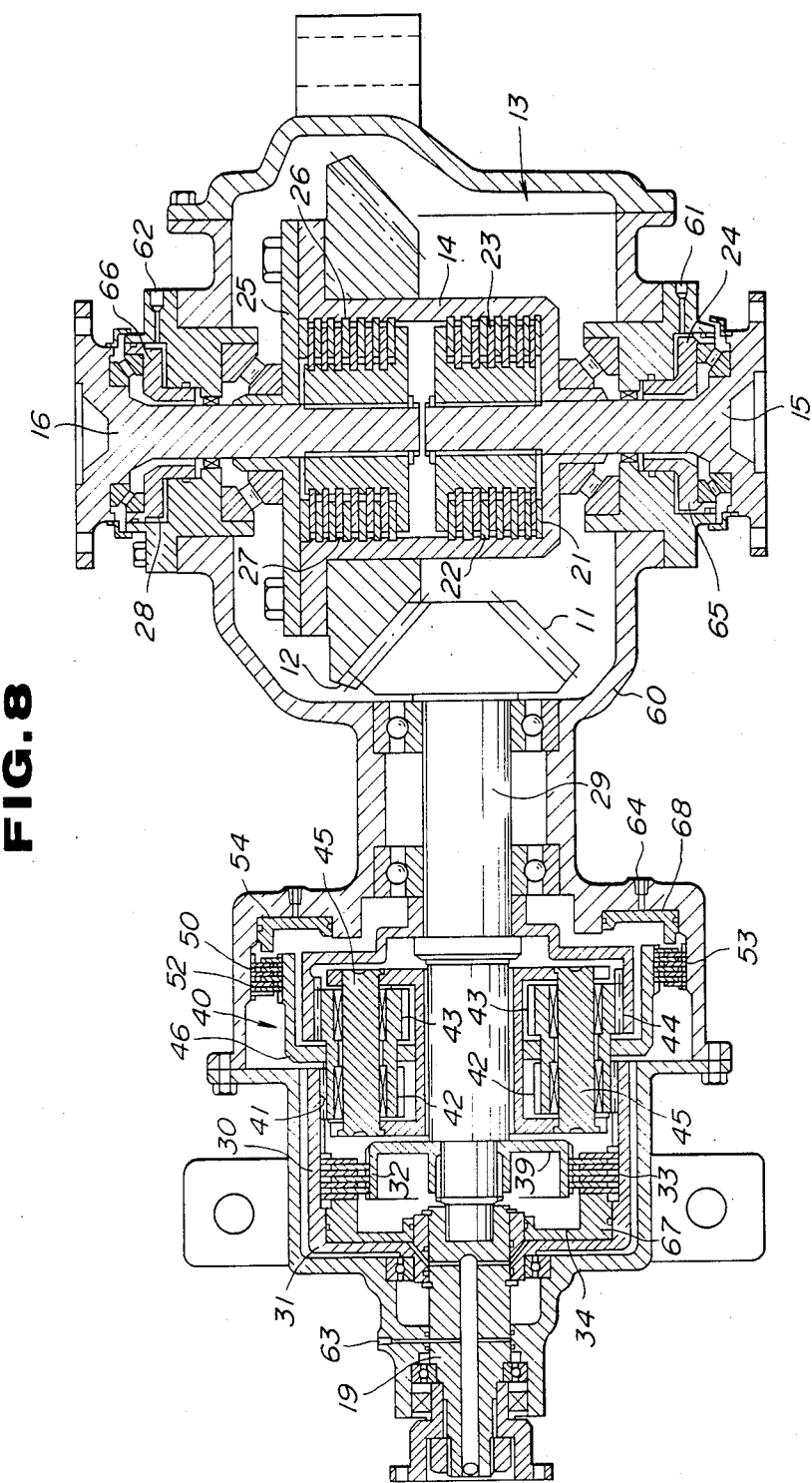
FIG. 8 is a horizontal cross-sectional view showing specific structural details of the speed increasing device of the first embodiment and a differential associated with auxiliary drive road wheels.

FIG. 8 specifically shows structural details of the speed increasing device and the differential associated with the auxiliary drive road wheels in the front and rear road wheel drive apparatus according to the present invention. The speed increasing device shown in FIG. 8 is basically identical to the speed increasing device in accordance with the first embodiment of the present invention.

As shown in FIG. 8, the speed increasing device and the differential are accommodated in a housing 60 supported on a motor vehicle body (not shown).

When oil pressure is supplied to the direct coupling clutch 30 through a port 63, a hydraulic pressure chamber 34 thereof is expanded to move a piston 67 axially to the right. The axial movement of the piston 67 presses the outer plates 32 on the input shaft 19 toward the inner plates 33 supported on a holder 39 fixed to the end of the output shaft 29, thereby bringing these outer and inner plates 32, 33 into frictional engagement dependent on the supplied oil pressure. The speed increasing clutch 50 is supplied with oil pressure via a port 64 to expand a hydraulic pressure chamber 54 to move a piston 68 axially. Upon axial movement of the piston 68, the outer plates 52 supported in the housing 60 and the inner plates 53 on the carrier 46 are pressed toward each other and frictionally engaged dependent on the supplied oil pressure. In the differential to which drive power is applied from the output shaft 29, the output shafts 15, 16 are moved outwardly away from each other in unison with pistons 65, 66 by oil pressure introduced into the hydraulic pressure chambers 24, 28 of the hydraulic multiplate clutches 21, 25 through respective ports 61, 62. The outer plates 22, 26 and the inner plates 23, 27 are thus frictionally engaged by forces dependent on the supplied oil pressure.

Figure 9:
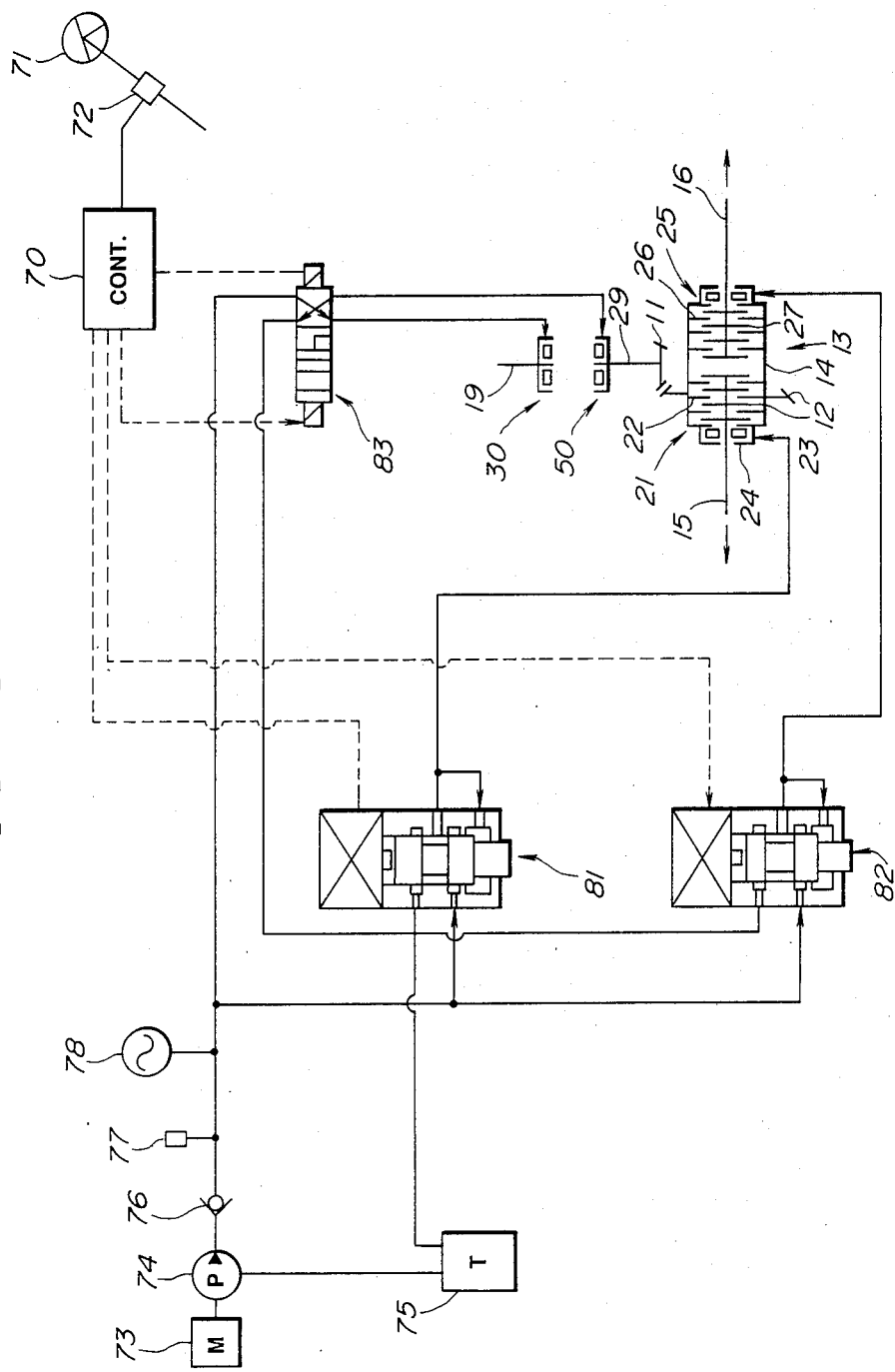
FIG. 9 is a diagram of a hydraulic pressure control circuit for controlling the front and rear road wheel drive apparatus of the present invention which is mounted on a motor vehicle.

FIG. 9 shows by way of example a hydraulic pressure control circuit for controlling the front and rear road wheel drive apparatus of the present invention which is mounted on a motor vehicle. The hydraulic pressure control circuit includes a control unit 70, a steering wheel 71, a steering force sensor 72, a motor 73, an oil pump 74, an oil tank 75, a check valve 76, an oil pressure switch 77, an accumulator 78, a pair of pressure regulating valves 81, 82 for controlling the hydraulic multiplate clutches 21, 25 coupled to the road wheels, and a solenoid-operated directional control valve 83 of a speed increasing device.

The pressure regulating valves 81, 82 for controlling the hydraulic multiplate clutches 21, 25 and the solenoid-operated directional control valve 83 shared by the direct coupling clutch 30 and the speed increasing clutch 50 are arranged parallel to each other with respect to the oil pressure source.

The control unit 70 controls the pressure regulating valves 81, 82 and the directional control valve 83 with control signals based on operating conditions (turning conditions) of the motor vehicle such for example as a steering force detected by the sensor 72, for regulating oil pressures supplied to the hydraulic multiplate clutches 21, 25 and selectively engaging and disengaging (i.e., turning ON and OFF) the direct coupling clutch 30 and the speed increasing clutch 50.

The hydraulic pressure control circuit shown in FIG. 9 can control the hydraulic multiplate clutches 21, 25 independently of each other.

With the present invention, as described above, the drive power applied to the auxiliary drive road wheels can be made greater than the drive power applied to the main drive road wheels by the speed increasing device disposed on the power transmitting path from the differential coupled to the main drive road wheels to the differential coupled to the auxiliary drive road wheels in the 4WD motor vehicle, or by the converting means for variably converting the applied drive power with respect to the rotational speed. By controlling the torque transmitting clutches in the auxiliary drive road wheel differential, the drive torque applied to an outer one of the auxiliary drive road wheels is made greater than the drive torque applied to an inner one of the auxiliary drive road wheels while the motor vehicle is making a turn for improving the turning performance of the motor vehicle in low- and medium-speed ranges. Conversely, the running stability of the motor vehicle in a high-speed range can also be improved by increasing the drive torque applied to an inner one of the auxiliary drive road wheels greater than the drive torque applied to an outer one of the auxiliary drive road wheels while the motor vehicle is making a turn in the high-speed range.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. An apparatus for driving the front and rear road wheels of a motor vehicle by transmitting drive power from a drive power source to the road wheels which serve as main and auxiliary drive road wheels of the motor vehicle, said apparatus comprising:

a first differential operatively coupled to the main drive road wheels for receiving the drive power from the drive power source;

a second differential operatively coupled to the auxiliary drive road wheels and having clutch means for variably adjusting the amounts of drive power to be transmitted to the auxiliary drive road wheels independently of each other;

speed changing means for increasing the rotational speed of the auxiliary drive road wheels with respect to the rotational speed of the main drive road wheels; and control means, in response to operating conditions of the motor vehicle, for controlling said speed changing means so as to increase the rotational speed of the auxiliary drive road wheels to be greater than that of the main drive road wheels and for controlling said clutch means so as to adjust the amounts of drive power to be transmitted to each of the auxiliary drive road wheels independently of one another.

2. An apparatus according to claim 1, wherein said speed changing means comprises hydraulic multiplate clutches and a planetary gear mechanism.

3. An apparatus according to claim 1, wherein said speed changing means comprises hydraulic multiplate clutches and a one-way clutch.

4. An apparatus according to claim 1, further comprising a propeller shaft including an input shaft interconnecting said first differential and said speed changing means and an output shaft interconnecting said speed changing means and said second differential, and wherein said speed changing means comprises a direct coupling clutch capable of directly coupling said input and output shafts to each other, and a speed increasing mechanism for increasing the rotational speed of the drive power from said input shaft and transmitting the drive power with the increased rotational speed to said output shaft.

5. An apparatus according to claim 4, wherein said speed increasing mechanism comprises a planetary gear mechanism for being fixed to a motor vehicle body of the motor vehicle and for increasing the rotational speed of the drive power from said input shaft and transmitting the drive power with the increased rotational speed to said output shaft, when said direct coupling clutch is disengaged.

6. An apparatus according to claim 4, wherein said speed increasing mechanism comprises a countershaft disposed parallel to said input and output shafts for receiving the drive power from said drive power source through said input shaft and gears, and a speed increasing clutch operatively coupled to said countershaft through gears and disposed coaxially with said output shaft for receiving the drive power with the rotational speed higher than the rotational speed of said input shaft, said speed increasing clutch being directly connectable to said output clutch when said direct coupling clutch is disengaged.

7. An apparatus according to claim 4, wherein said speed increasing mechanism comprises a first countershaft portion operatively coupled to said input shaft at a first predetermined gear ratio, a second countershaft portion operatively coupled to said output shaft at a second predetermined rear ratio, and a speed increasing clutch for directly coupling said first and second countershaft portions to each other when said direct coupling clutch is disengaged, said first and second predetermined gear ratios being selected such that when said first and second countershaft portions are directly coupled to each other by said speed increasing clutches, the drive power from said input shaft is transmitted with the increased rotational speed to said output shaft.

8. An apparatus for driving the front and rear road wheels of a motor vehicle by transmitting drive power from a drive power source to the road wheels which serve as main and auxiliary drive road wheels of the motor vehicle, said apparatus comprising:

a first differential operatively coupled to the main drive road wheels for receiving the drive power from the drive power source;

a second differential operatively coupled to the auxiliary drive road wheels and having clutch means for variably adjusting the amounts of drive power to be transmitted to the auxiliary drive road wheels independently of each other;

a drive power transmitting mechanism for connecting said first and second differentials to each other in torque transmitting relation and for receiving the drive power from said drive power source in complementary torque transmitting relation to said first differential;

converting means for variably converting the drive power applied to said drive power transmitting mechanism with respect to the rotational speed thereof and applying the drive power with the converted rotational speed to said second differential; and control means, in response to operating conditions of the motor vehicle, for controlling said converting means to increase the rotational speed of the auxiliary drive wheels to be greater than that of the main drive wheels and for controlling said clutch means so as to adjust the amount of drive power to be transmitted to each of the auxiliary drive wheels independently of one another.

9. An apparatus according to claim 8, wherein said converting means comprises a speed increasing device for increasing the rotational speed of the drive power applied to said drive power transmitting mechanism and transmitting the drive power with the increased rotational speed to said second differential.

10. An apparatus according to claim 9, wherein said drive power transmitting mechanism comprises a propeller shaft including an input shaft interconnecting said first differential and said speed increasing device and an output shaft interconnecting said speed increasing device and said second differential, and wherein said speed increasing device comprises a direct coupling clutch capable of directly coupling said input and output shafts to each other, and a speed increasing mechanism for increasing the rotational speed of the drive power from said input shaft and transmitting the drive power with the increased rotational speed to said output shaft when said direct coupling clutch is disengaged.

* * * * *